United States Patent Office 3,415,543
Patented Dec. 10, 1968

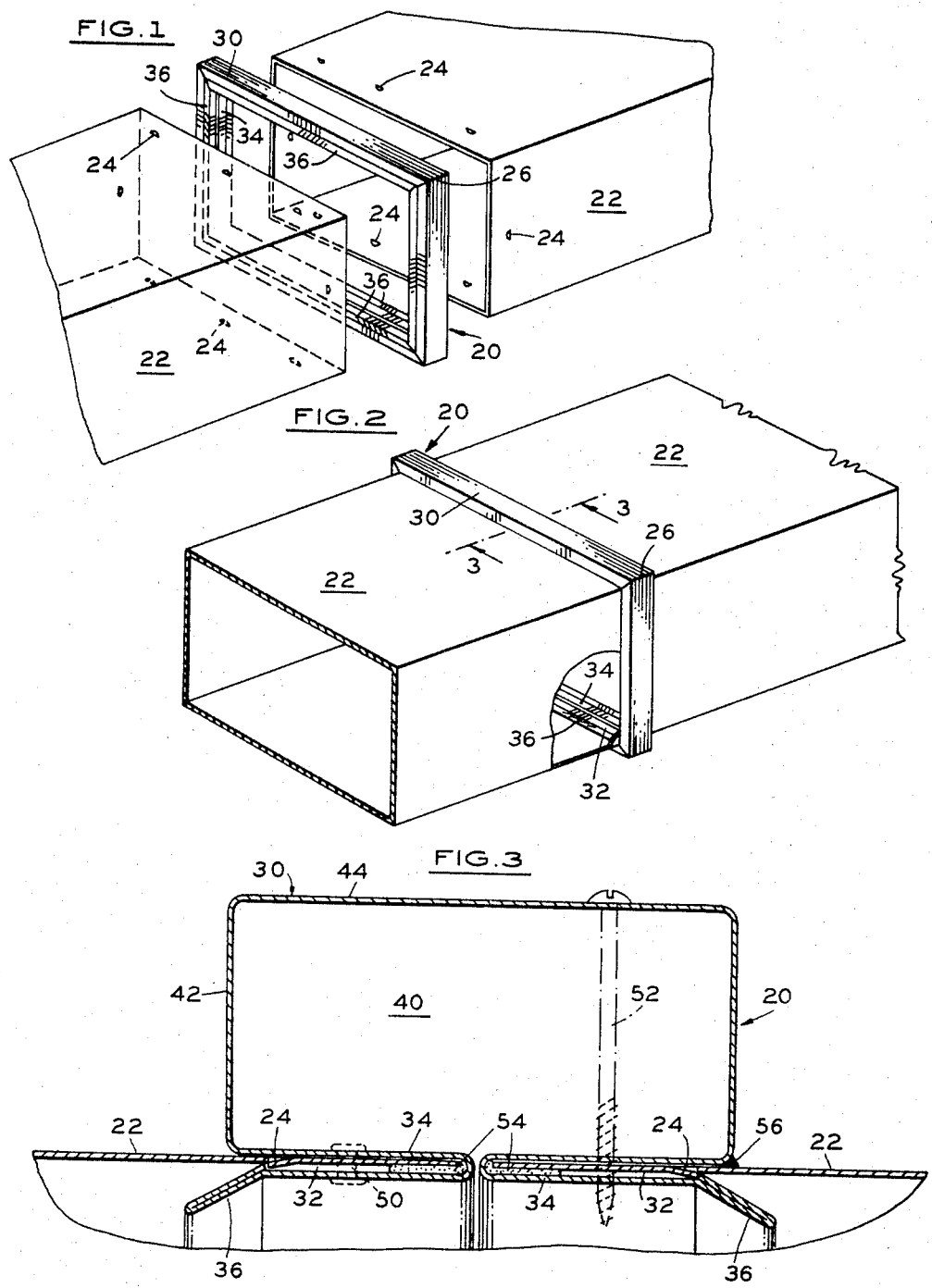

3,415,543
COUPLING FRAME
Henry M. Keating, 18945 Gilchrist,
Detroit, Mich. 48235
Filed July 8, 1965, Ser. No. 470,374
7 Claims. (Cl. 285—24)

ABSTRACT OF THE DISCLOSURE

This disclosure relates to a coupling frame, including a hollow channel which overlies the duct or wall sections to be joined, and a pair of reversely folded legs which define opposed wall receiving channels. In the preferred embodiment, the frame is rectangular and defines a chamber which overlies the junction of the duct or wall sections.

This invention relates to a novel and improved coupling frame which provides for the quick forming of joints between adjacent wall structures. The invention is particularly, although not exclusively, adapted for use in joining high pressure industrial duct sections and suspended ceiling panels.

The invention consists of a hollow frame, substantially rectangular in cross section which overlies the sections to be joined, having reversely folded legs on one side thereof which define oppositely disposed channels for receipt of the sections to be joined. The legs end in angularly related laterally disposed locking lips, which extend back toward the legs to engage and lock the sections within the channels.

The rectangular cross section frame provides many advantages over previous frame designs. The shape of the frame makes the joint sufficiently resilient to allow for joining of misaligned sections and allow for expansion and contraction of the sections. The chamber defined by the rectangular cross section frame is functional whether the coupling frame is used to connect suspended ceiling panels, or high pressure industrial ducts. As a coupling frame for ceiling panels the chamber may carry electrical wiring or piping, and allow easy access and maintenance. As a coupling frame for pressure ducts, the chamber provides an insulated sealed communication with the interior of the ducts joined. In either application the frame may be used to suspend the ceiling or duct sections from a suitable support.

Previous "snap-in" structures of this type were designed with the duct-receiving channels at the radial outer periphery of the frame, which required the corners of a rectangular frame to be open. Such structures are unacceptable in high pressure industrial use, because of the loss of pressure and heat at these corners. The joining frame of this invention is provided with a continuous channel, which seals the duct about its entire periphery.

Other frames of this type were provided with tightly flattened portions overlying the inside of the duct sections. This structure is not sufficiently resilient to allow for expansion and contraction, or to join misaligned sections, and allowed large heat losses at the joint. The hollow rectangular cross section of the coupling frame of my invention allows the channels to resiliently yield to join misaligned sections, and the sealed chamber insulates the joint against heat exchange and pressure loss.

The coupling frame of this invention is easily installed and may be readily removed, yet the coupling frame provides a reliable sealed joint between high pressure industrial ducts.

The joining frame of this invention is inexpensive to construct, while providing the requisite rigidity between suspended sections.

Other objects, advantages and meritorious features will become more fully apparent from the following specification, claims and accompanying drawings, wherein:

FIG. 1 is a perspective view of the coupling frame, and two duct sections aligned for joining;

FIG. 2 is a perspective view of my invention with a portion cut away to show construction details; and FIG. 3 is a side elevation of a cross section in the direction of view arrows 3—3 of FIG. 2.

Referring to FIGS. 1 and 2, wherein 20 is one embodiment of the coupling frame of my invention, and 22 indicates a pair of rectangular high pressure industrial gauge ducts. The ducts are provided with locking tabs 24 spaced about their periphery near their adjoining ends. The frame 20 of this embodiment has been mitered at the corners 26 and welded or fused by other suitable means to provide a continuous rectangular cross section outer frame 30, and continuous duct-receiving channels 32.

The duct joint of this embodiment of my invention will maintain a static pressure of at least eight inches without leakage. High pressure in duct systems is above five and one-half inches of static pressure.

Conventional high pressure duct joints require a flange or lip of approximately one inch on the ends of the duct sections, which are bolted to the flange of the adjoining ducts, or to a frame means. A seal, such as a strip of neoprene or asbestos, is generally provided between the flanges. This joint is difficult to secure, especially in large duct systems where the access is very limited, and the flanges must be accurately aligned to insure a properly sealed joint. Further, the flanges or lips at the end of the duct sections often become damaged out of alignment, so that they must be straightened before use or discarded.

Another problem with the conventional high pressure duct joint is the "pile-up" of length variations caused by forming the flanges or lips on the end of the ducts. This becomes an important factor in long industrial duct systems. Further, because the flanges are formed from the ducts, the corners of the duct must be open, which may allow leakage at high pressures.

These problems have been eliminated, because the coupling frame of my invention does not require a flange or lip at the end of the duct sections. The spacing between the ducts is approximately one-quarter inch, which may be accurately controlled to prevent the "pile-up" of length variations, and sections of one-quarter inch less than existing stock may easily be supplied to form sections in even feet.

Other attempts have been made to design duct joints in which adjoining duct ends are forced or snapped into a frame means, without deforming the duct ends into flanges or lips. However these joints have proved unsatisfactory in high pressure industrial duct systems. They lack the resiliency necessary to join rigid duct sections which are not accurately aligned, and the overall rigidity necessary to join long sections of industrial gauge ducts. Further, the corners generally must be left open, which is unacceptable in high pressure systems.

This embodiment of my invention combines the advantages of "snap-in" type duct joints, which are used in low pressure home duct systems, while providing a duct joint which may be used in high pressure industrial duct systems.

FIG. 3 shows how these advantages of my invention are carried out. The hollow rectangular cross section upper frame 30 overlies the adjoining duct ends 22, which are received in continuous channels 32. The channels are defined by reversely folded legs 34, integral with the upper frame 30. The distal ends of the legs 34 have angularly related laterally extending locking lips 36, which engage and retain the locking tabs 24 struck from the ducts 22.

The continuous upper frame 30 defines a chamber 40, which communicates with the interior of the ducts 22. In the preferred embodiment of my invention, the generally radial height of the upper frame, defined by the walls 42, is at least one-half of the generally axial length of the frame defined by the wall 44. This provides the flexibility required to join duct sections which are not accurately aligned. It also allows the ducts to expand and contract without disturbing the joint, even when the ducts are riveted or otherwise secured to the frame. The ducts may be secured to the frame by pop rivets 50, which are attached from the inside of the duct, without providing fluid escape to the atmosphere. Lock screws, shown at 52, may also be used with less danger of leakage. Such securing means are optional in high pressure systems subject to vibration, etc.

The chamber 40 also acts as an insulator, and may be filled with a deformable insulating material, such as plastic foam, in high temperature systems.

Caulking may be used in vacuum systems, or where pressure maintenance is extremely critical. Caulking is shown in the duct-receiving channels at 54, and at 56. The inside diameter of the upper frame 30 is designed to tightly engage the outer surface of the duct 22 to aid in sealing.

The detailed description, to this point, has been related to joining means for rectangular ducts, however it can be seen from FIG. 3 that the coupling frame is equally adaptable to circular ducts, or ceiling panels.

When used to join ceiling panels the rectangular cross section frame 30 is below the level of the ceiling, and may carry electrical wiring or piping. The frame may be supported by a suitable support means which extends between the reversely folded legs 34 to engage the legs in support of the panels.

The means of this invention is subject to various modifications and changes in structural details, and such are to be included as part of the invention except where limited by the appendant claims.

What is claimed is:

1. A coupling channel for receiving and joining wall sections, comprising: an outer channel section adapted to overlie the wall sections to be joined, the opposed lateral edges of said channel section shaped to provide a pair of legs reversely folded beneath the open side of said channel section to define generally opposed wall-receiving channels, said legs terminating in angularly related guiding ramp portions generally opposite said opposed lateral edges of said channel section and extending laterally therebeyond, said guiding ramp portions extending away from the opening of said wall receiving channels at an acute angle to the plane of said reversely folded legs to provide support and a guide for the reception of the wall sections, the opposed ends of said guiding ramp portions reversely folded to closely overlie said ramp portions and provide a locking lip which extends into said wall-receiving channels and means on said wall sections coacting with said locking lips to inhibit removal of a wall section received therein.

2. The coupling channel defined in claim 1, characterized in that said outer channel section includes side wall portions extending from said lateral edges to a point lying spaced from the plane including said lateral edges to provide longitudinal rigidity to the coupling channel and lateral flexing about said point.

3. The coupling channel defined in claim 2, characterized in the said wall portions defined a generally rectangular hollow channel adapted to overlie the wall sections to be joined including a wall portion generally parallel to but spaced from said plane.

4. The invention as defined in claim 1 characterized in that the wall sections to be joined are opposed hollow ducts and said outer channel section of the coupling channel is configured to closely overlie the exterior of the juxtaposed ends of the ducts and extend transversely about the ducts.

5. The invention as defined in claim 4, characterized in that the ducts are rectangular and there are a plurality of coupling channels with means connecting said coupling channels together at opposite ends to provide a rectangularly shaped coupling channel frame for encircling, connecting and supporting the ducts in end to end relation.

6. A coupling frame for receiving and joining wall sections, comprising: a generally rectangular hollow outer channel adapted to overlie the wall sections to be joined, the opposed lateral edges of said outer channel shaped to provide a pair of legs reversely folded beneath the open side of said outer channel to define opposed wall receiving channels terminating in angularly related guiding ramp portions extending at an acute angle to the planes of said legs and beyond said opposed lateral edges of the hollow outer channel to supportingly receive the wall sections, and said legs including locking lips adjacent said lateral edges of the outer channel to inhibit withdrawal of wall sections received in said wall receiving channels, said hollow outer channel including two generally parallel wall portions extending from said lateral edges and an outer wall portion generally parallel to a plane including said lateral edges to define two substantially parallel spaced edges which provide longitudinal rigidity.

7. The coupling channel defined in claim 6, characterized in that said wall receiving channels include a sealing means which seals the wall sections in the channels and prevents vibrational contact between the wall sections and the walls of the channel.

References Cited

UNITED STATES PATENTS

| | | |
|---|---|---|
| 2,211,384 | 8/1940 | Patterson. |
| 2,396,257 | 3/1946 | Fould. |
| 2,531,349 | 11/1950 | Brett. |
| 2,710,079 | 6/1955 | Kunert. |
| 1,935,690 | 11/1933 | Zack _____ 285—331 |
| 2,126,499 | 8/1938 | Peterson _____ 285—424 X |
| 2,498,753 | 2/1950 | Deitsch _____ 285—417 X |
| 2,890,899 | 8/1959 | Simmons _____ 285—371 X |
| 3,246,918 | 4/1966 | Burghart _____ 285—331 X |

FOREIGN PATENTS

| | | |
|---|---|---|
| 992,163 | 8/1951 | France. |
| 775,841 | 5/1957 | Great Britain. |
| 1,363,255 | 5/1964 | France. |

CARL W. TOMLIN, *Primary Examiner.*

DAVE W. AROLA, *Assistant Examiner.*

U.S. Cl. X.R.

285—331, 369, 374, 403, 424; 287—189.36; 52—495